United States Patent
Gallagher et al.

(10) Patent No.: US 9,436,271 B2
(45) Date of Patent: *Sep. 6, 2016

(54) SYSTEM AND METHOD FOR PROVIDING POWER-SAVE OPERATION IN AN IN-HOME COMMUNICATION NETWORK

(71) Applicant: MaxLinear, Inc., Carlsbad, CA (US)

(72) Inventors: Timothy Gallagher, Encinitas, CA (US); Glenn DeLucio, San Diego, CA (US); Curtis Ling, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/981,102

(22) Filed: Dec. 28, 2015

(65) Prior Publication Data

US 2016/0109935 A1      Apr. 21, 2016

Related U.S. Application Data

(63) Continuation of application No. 14/541,349, filed on Nov. 14, 2014, now Pat. No. 9,223,382, which is a continuation of application No. 13/349,856, filed on Jan. 13, 2012, now Pat. No. 8,892,926, application No. 14/981,102, which is a continuation of application No. 14/335,989, filed on Jul. 21, 2014, which is a continuation of application No. 13/328,634, filed on Dec. 16, 2011, now Pat. No. 8,788,728.

(51) Int. Cl.
| | |
|---|---|
| *G06F 1/32* | (2006.01) |
| *H04N 21/436* | (2011.01) |
| *H04L 12/861* | (2013.01) |
| *H04L 12/10* | (2006.01) |
| *H04N 21/443* | (2011.01) |

(52) U.S. Cl.
CPC ........... *G06F 1/3296* (2013.01); *G06F 1/3234* (2013.01); *H04L 12/10* (2013.01); *H04L 49/90* (2013.01); *H04N 21/43615* (2013.01); *H04N 21/4436* (2013.01)

(58) Field of Classification Search
CPC .. G06F 1/32; G06F 1/3234; H04N 21/43615
USPC ................................................. 713/320, 323
See application file for complete search history.

(56) References Cited

U.S. PATENT DOCUMENTS

| | | | |
|---|---|---|---|
| 6,438,375 B1 * | 8/2002 | Muller ............. | H04W 52/0216 340/7.33 |
| 8,892,926 B2 * | 11/2014 | Gallagher ............. | G06F 1/3234 713/320 |

(Continued)

*Primary Examiner* — Chun Cao (74) *Attorney, Agent, or Firm* — McAndrews, Held & Malloy, Ltd.

(57) ABSTRACT

A first device of a multimedia over coax alliance (MoCA) network may grant a second device of the MoCA network permission to enter a power-saving state. While the second device is in the power-saving mode, the first device may grant bandwidth to the second device during one or more predetermined timeslots. The bandwidth may be granted without a corresponding reservation request from the second device. While the second device is in the power-saving state, it may track time utilizing a clock that is synchronized to the system time of the MoCA network, and transmit during one or more of the predetermined timeslots without first transmitting a corresponding reservation request. The second device may utilize a first modulation profile when not operating in the power-saving state, and utilize a second modulation profile when operating in the power-saving state.

31 Claims, 6 Drawing Sheets

(56) References Cited

U.S. PATENT DOCUMENTS

| | | | |
|---|---|---|---|
| 9,223,382 B2* | 12/2015 | Gallagher | G06F 1/3234 |
| 2002/0102970 A1* | 8/2002 | Moon | H04M 1/72561 |
| | | | 455/414.3 |
| 2003/0053554 A1 | 3/2003 | McCrokle et al. | |
| 2003/0220765 A1 | 11/2003 | Overy et al. | |
| 2005/0265503 A1 | 12/2005 | Rofheart et al. | |
| 2007/0135162 A1* | 6/2007 | Banerjea | H04W 76/026 |
| | | | 455/556.1 |
| 2007/0249288 A1 | 10/2007 | Moallemi et al. | |
| 2009/0016723 A1 | 1/2009 | Taniguchi et al. | |
| 2009/0063878 A1* | 3/2009 | Schmidt | G06F 1/3209 |
| | | | 713/310 |
| 2010/0031297 A1* | 2/2010 | Klein | H04L 12/12 |
| | | | 725/78 |
| 2011/0080850 A1* | 4/2011 | Klein | H04L 12/2801 |
| | | | 370/254 |
| 2011/0116429 A1* | 5/2011 | Jeon | H04W 74/002 |
| | | | 370/311 |
| 2011/0264818 A1* | 10/2011 | Riggert | H04L 47/18 |
| | | | 709/231 |
| 2012/0030320 A1* | 2/2012 | Diab | H04L 12/12 |
| | | | 709/220 |
| 2012/0089851 A1* | 4/2012 | Ting | G06F 1/3206 |
| | | | 713/310 |
| 2013/0159567 A1* | 6/2013 | Gallagher | G06F 13/20 |
| | | | 710/52 |

* cited by examiner

SYSTEM AND METHOD FOR PROVIDING POWER-SAVE OPERATION IN AN IN-HOME COMMUNICATION NETWORK

PRIORITY CLAIM

This patent application is a continuation of U.S. patent application Ser. No. 14/541,349 filed Nov. 14, 2014 (now U.S. Pat. No. 9,223,382), which is a continuation of U.S. patent application Ser. No. 13/349,856 filed on Jan. 13, 2012 (now U.S. Pat. No. 8,892,926). This application is also a continuation of U.S. patent application Ser. No. 14/335,989 filed on Jul. 21, 2014, which is a continuation of U.S. patent application Ser. No. 13/328,634 filed on Dec. 16, 2011 (now U.S. Pat. No. 8,788,728). Each of the above referenced documents is hereby incorporated herein by reference in its entirety.

FIELD OF THE INVENTION

Certain embodiments of the invention relate to networking. More specifically, certain embodiments of the invention relate to a System and Method for Providing Power-save Operation in an In-home Communication Network.

BACKGROUND OF THE INVENTION

Existing in-home networks consume too much power. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for power-save operation in an in-home communication network, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be implemented in hardware, software, firmware, or any combination of one or more thereof. As utilized herein, the term "exemplary" means serving as a non-limiting example, instance, or illustration. As utilized herein, the terms "e.g." and "for example" introduce a list of one or more non-limiting examples, instances, or illustrations.

Figure 1:
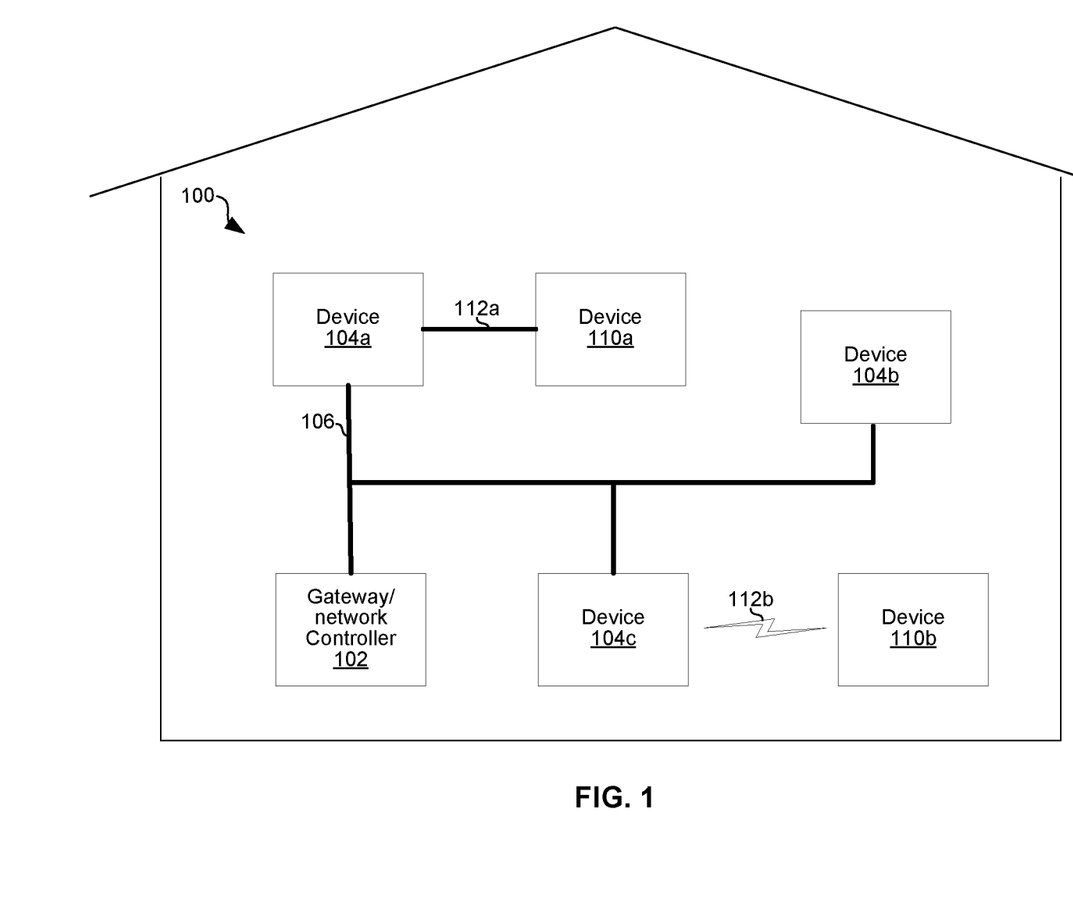
FIG. 1 depicts an exemplary in-home network.

FIG. 1 depicts an exemplary in-home network. FIG. 1 illustrates a local area network (LAN) 100 comprising network devices 102 and 104a-104c coupled via a shared channel 106. The LAN 100 also comprises devices 110a and 110b coupled to network devices 104a and 104c via links 112a and 112b, respectively.

The shared channel 106 may comprise, for example, wired and/or optical cabling. In an exemplary embodiment, the shared channel 106 may comprise coaxial cabling.

The device 102 may comprise circuitry operable to communicate over the shared channel 106. The circuitry of the device 102 may also be operable to support one or more of the devices 104a-104c operating in one or more power-saving states, and/or the device 102 itself operating in one or more power-saving states. The device 102 may be, for example, a set-top box, a gateway, or a router. In an exemplary embodiment, the device 102 may communicate over the shared channel 106 in accordance with Multimedia over Coax Alliance (MoCA) standards. In such an embodiment, the device 102 may function as the network coordinator of the MoCA network.

Each of the devices 104a-104c may comprise circuitry operable to communicate over the shared channel 106. Where the network 100 is a MoCA network, the devices 104a and 104c may be termed an "intermediate device" and the device 104b may be termed a "terminal device." The device 104c may be, for example, a wireless access point operable to convert between the network protocols (e.g., MoCA or DOCSIS) utilized on the shared channel 106 and the network protocols (e.g., IEEE 802.11) utilized on the link 112b. The device 104a may be, for example, a network adaptor operable to convert between the network protocols (e.g., MoCA or DOCSIS) utilized on the shared channel 106 and the network protocols (e.g., HDMI or USB) utilized on the link 112a.

The devices 110a and 110b may comprise circuitry operable to communicate media and/or data via the links 112a and 112b, respectively. Each of the devices 110a and 110b may be, for example, an end-point such as a television or personal computer.

In operation, communications on the shared channel 106 may be coordinated by the device 102. The device 102 may control which devices are granted admission to the network 100. The device 102 may control which of the devices of the network 100 may communicate on the shared channel 106, and control at which times and/or on which frequencies such communication occurs. The device 102 may control whether one or more devices of the network 100 are permitted to operate in a power-saving state. When one or more devices of the network 100 are operating in a power-saving state, the device 102 may adjust its behavior and/or the behavior of other devices, as is described in further detail below.

Figure 2:
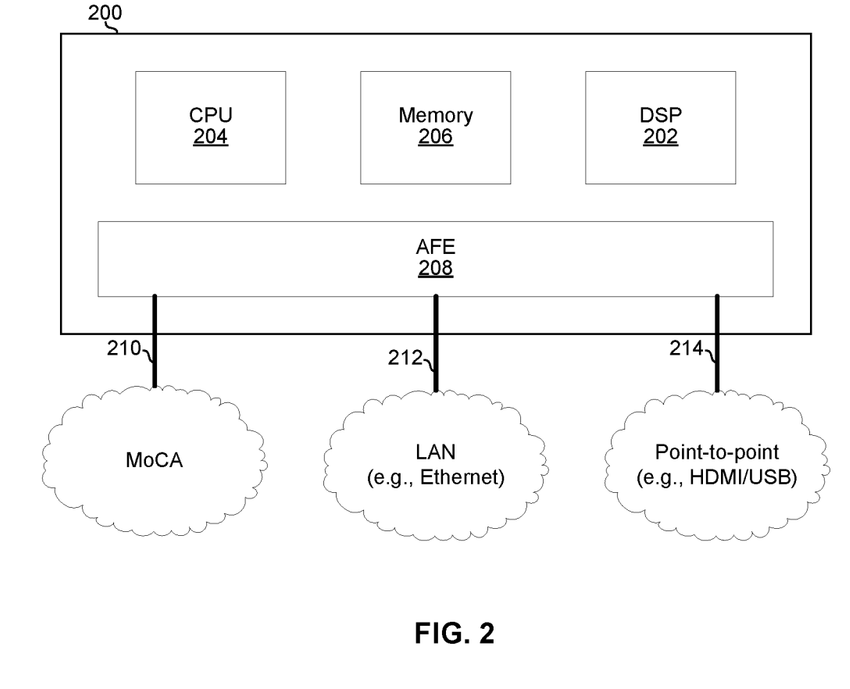
FIG. 2 depicts an exemplary networking device.

FIG. 2 depicts an exemplary networking device. The exemplary device 200 comprises a plurality of modules including a digital signal processor (DSP) 202, a central processing unit (CPU) 204, a memory 206, and an analog front end (AFE) 208. The device 200 may, for example, represent any of the devices 102, 104a, 104b, and 104c, although any one of those devices may comprise additional or fewer features than the device 200.

The AFE 208 may be operable to transmit and/or receive information utilizing any suitable communication protocol(s). The AFE 208 may be operable to perform analog-domain processing operations that enable transmission and/or reception of signals in accordance with one or more communication protocols. In an exemplary embodiment, the AFE 208 may be operable to transmit and/or receive signals in accordance with MoCA standards via a link 210, in accordance with another local area networking standard (e.g., Ethernet or Wi-Fi) via a link 212, and in accordance with a point-to-point communication protocol (e.g., USB or HDMI) via a link 214. The AFE 208 may comprise, for example, one or more clocks, one or more digital-to-analog converters, one or more analog-to-digital converters, one or more modulators, one or more demodulators, one or more amplifiers, and/or one or more filters. In an exemplary embodiment, the AFE 208 may be configurable into various states of operation, with the different states of operation being characterized by different power consumption. For example, in a power-saving state of operation, modulators and/or demodulators may be configured to utilize lower-order modulation and one or more amplifiers may be configured to provide less gain. Also for example, in a power-saving state of operation, one or more clocks may be slowed down or shut off (e.g., intermittently), one or more components may have a power supply removed (e.g., intermittently), etc.

The CPU 204 may be operable to execute instructions (e.g., an operating system) to control operations of the device 200. For example, the CPU 204 may generate control signals for configuring a state of operation of the device 200, and controlling operation of the other components of the device 200. In an exemplary embodiment, the CPU 204 may be configurable into various states of operation, with the different states of operation being characterized by different power consumption. For example, in a power-saving state of operation, the CPU 204 may execute fewer instructions per time interval than when not operating in the power-saving state.

The memory 206 may comprise any suitable type of volatile and/or non-volatile memory operable to store data and/or instructions. For example, the memory 206 may be utilized to store instructions executed by the CPU 204 and buffer data being transmitted and/or received via the AFE 208.

The DSP 202 may be operable to perform digital signal processing algorithms and functions in accordance with one or more communication standards. For example, the DSP 202 may be operable to perform digital filtering, constellation mapping, constellation demapping, interleaving, deinterleaving, and error correction. In an exemplary embodiment of the invention, the DSP 202 may be operable to perform digital-domain processing functions that enable transmission and/or reception of data in accordance with various standards such as MoCA, Ethernet, and HDMI via the AFE 208. In an exemplary embodiment, the DSP 202 may be configurable into various states of operation, with the different states of operation being characterized by different power consumption. For example, in a power-saving state of operation, different error-correction algorithms may be utilized, different interleaver depth may be utilized, and different constellation mappings may be utilized.

Figure 3:
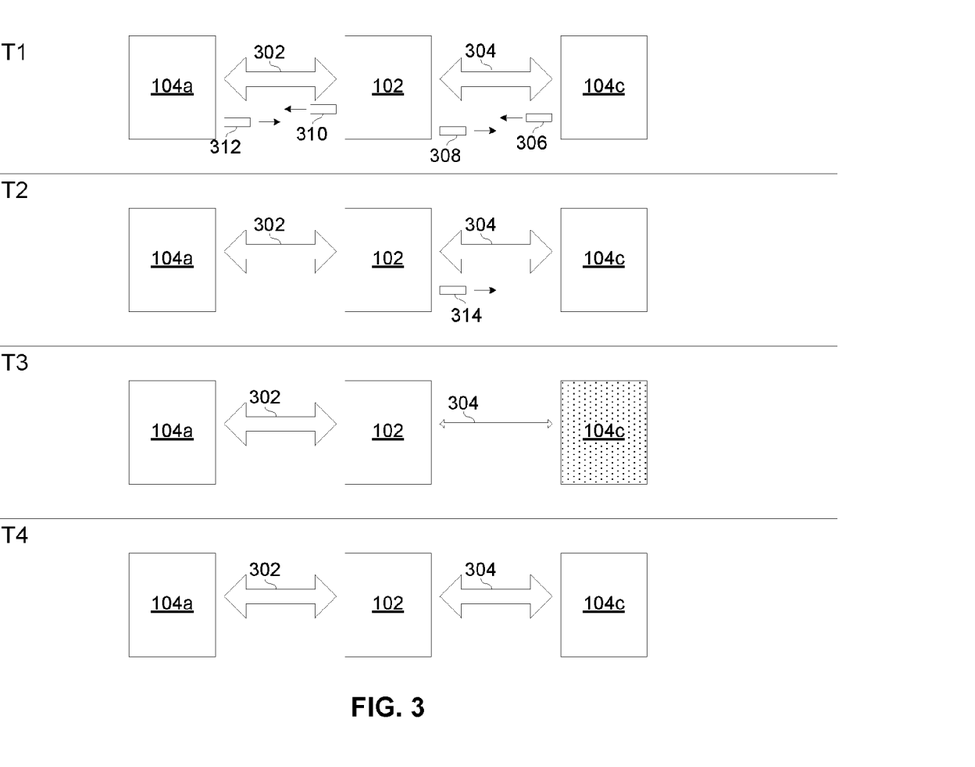
FIG. 3 is a diagram illustrating a network device transitioning into and out of a power-saving state.

FIG. 3 is a diagram illustrating a network device transitioning into and out of a power-saving state. Note that a single power-saving state is shown and discussed for clarity, but it should be recognized that a plurality of alternative power-saving states may be utilized, each having different respective characteristics, non-limiting examples of which will be presented herein. Shown in FIG. 3 are the devices 104a, 102, and 104c, with logical links between them represented as arrows 302 and 304, the width of the arrows 302 and 304 representing the bandwidth of the logical links.

During time interval T1, the network coordinator 102 exchanges messages 306 and 308 with the device 104c and messages 310 and 312 with the other devices of the network (of which only device 104a is shown for clarity of illustration) to coordinate the transition of device 104c into a power-saving state. The messages 306 may include a request for permission to enter the power-saving state. In addition, the messages 306, 308, 310, and 312 may include messages to coordinate various parameters such that the transition of device 104c to a power-saving state does not cause lost data, intolerable latency, and/or other problems in the network. For example, the devices 102 and 104a-104c may exchange parameters indicating (1) how long the device 104c will remain in the power-saving state, (2) what messages the device 104c will listen to while in the power-saving state, (3) what messages the device 104c will respond to while in the power-saving state, (4) what signal characteristics the device 104c will detect while in the power-saving state, (5) conditions for bringing the device 104c out of the power-saving state before the predetermined duration has expired, (6) whether the device 104c will be granted transmission opportunities while it is in the power-saving state, (7) how long such transmit opportunities will last, (8) when such transmission opportunities will occur, and/or (9) what PHY profile(s) will be used for communications between the device 102 and 104c both during and after the time period that the device 104c operates in the power-saving state. A PHY profile could include parameters such as, for example, modulation profile (i.e., the type and/or order of modulation to be used for each of one or more subcarriers), preamble type, cyclic prefix length, and transmit power. For example, a device could utilize BPSK when operating in a power-saving state and 64, 128, or 256-QAM when not operating in a power-saving state.

During time interval T2, after completing coordination of the transition, the device 102 may send a message 314 to device 104c granting permission for the device 104c to enter the power-saving state. Such a message may, for example, comprise information describing characteristics of the power-saving state (or set of power-saving states). For example, such a message may comprise information of any of the characteristics described above (e.g., of sleep duration, functionality maintained during sleep operation, modulation characteristics, message exchange sequences to follow, wake triggers, etc.). In an exemplary scenario, the device 102 may consider sleep operation parameters proposed by the device 104c during time interval T1, agreeing to such parameters and mandating and/or proposing alternative parameters as necessary. For example, during time interval T1, the device 104c might have proposed a sleep duration of $S_1$, which is greater than device 102 will allow (e.g., under current system conditions or ever). In such a scenario, during time interval T2, device 102 may command a different sleep duration of $S_2$, which is acceptable to device 102. Note that device 102 may determine sleep state parameters on its own or may, for example, determine sleep parameters based on communication with other devices in the network.

During time interval T3, the device 104c may operate in the power-saving state. In an exemplary embodiment, some bandwidth may be reserved for the device 104c while it is operating in the power-saving state. Such reserved bandwidth may be utilized by "always-on" portions of the device 104c and/or always-on devices which connect to the network 100 via the link 112b (FIG. 1).

In an exemplary embodiment, the reserved bandwidth may be achieved by the network coordinator 102 reserving periodic timeslots during which the device 104c may transmit without first having to send a reservation request. Such timeslots may be predetermined (i.e. determined during time interval T1) such that the device 104c may know when the timeslots will occur even if it has not listened to the corresponding media access plan (or MAP) message that granted the timeslot. In an embodiment of the invention, such MAP messages may be sent periodically and/or at predetermined times such that, if the node 104c desires to listen to a MAP, it can quickly power up, receive a MAP message, and return to the power-saving state. Similarly, in an embodiment of the invention, the network coordinator 102 may send beacons periodically and/or at predetermined times such that the device 104c can quickly power up, receive a beacon, and return to the power-saving state. In this regard, the device 104c may periodically and/or occasionally listen to a beacon in order to resynchronize its clock to the system time of the network 100. During the signaling discussed above, the network coordinator 102 may communicate information of the assigned periodic timeslot to the device 104c. Note that, depending on the implementation, it may be beneficial to also communicate such timeslot allocation information to other devices (e.g., to reduce contention for an already-allocated medium), but such communication is generally not necessary. For example, the network controller 102, knowing about the timeslot allocation to the device 104c, may (e.g., in response to a bandwidth request from another device) allocate bandwidth during the timeslot to a device expressing a desire to communicate with the device 104c, and refrain from allocating bandwidth during such timeslot for a communication that does not involve the device 104c.

In an exemplary scenario, the network coordinator 102, being generally in control of bandwidth allocation on the network, may allocate the timeslot to the device 104c, even when the protocol generally governing bandwidth utilization on the network does not inherently provide for such time-slotted operation. For example, in an exemplary scenario, the network controller 102 may allocate time slots to devices operating in a power-save mode, and not allocate time slots to devices that are operating in a normal (e.g., non-power-save) mode.

During time interval T4, the device 104c may transition out of the power-saving state and return to an active state in which it fully participates in network activities. In an exemplary embodiment, the device 104c may transition out of the power-saving state upon a timeout and/or upon the device 102 signaling it to transition out of the power-saving state (e.g., because another device has latency-sensitive traffic to send to the device 104c).

Figure 4:
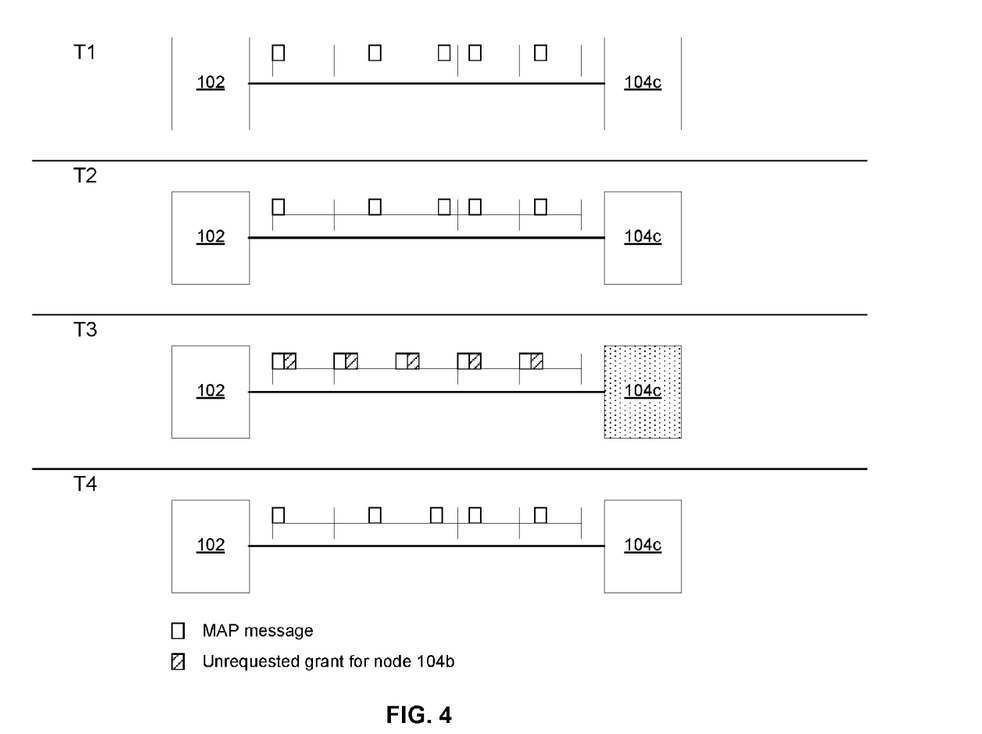
FIG. 4 is a diagram illustrating exemplary media access planning to support a power-saving state.

FIG. 4 is a diagram illustrating exemplary media access planning to support a power-saving state. FIG. 4 illustrates an exemplary embodiment in which, during time interval T3 when device 104c is in a power-saving state, the network coordinator 102 sends MAP messages at fixed intervals and/or predetermined times. During other time intervals, when the device 104c is not in a power-saving state, the MAP messages are sent asynchronously. Sending MAP messages at fixed intervals and/or predetermined times enables the device 104c to quickly find MAP messages without having to listen for an extended period of time.

FIG. 4 also illustrates an exemplary embodiment in which, during time interval T3 when the device 104c is in a power-saving state, reserves timeslots during which the device 104c may transmit without having to first send a reservation request. In this manner, the device 104c may be enabled to buffer data while it sits in a low-power state waiting for its next reserved timeslot, then, at the next reserved timeslot, it can quickly wake-up, burst out the buffered data, and then return to the power-saving state. During such wake time, the device 104c may also listen for messages addressed to it from other devices. To facilitate this, the network controller 102 may schedule the periodic reserved timeslot adjacent in time to the MAP (Media Access Plan) timeslot such that the device 104 has an opportunity to both listen for messages and possibly transmit data in a single wake-up cycle. The duration of the timeslots may be determined based on, for example, the amount and/or type of data to be communicated during the timeslots. For example, a reserved timeslot may be of longer duration if high-bandwidth traffic, such as high-definition multimedia, is to be transmitted during the timeslot, and may be of shorter duration if low-bandwidth traffic, such as network management traffic, is to be transmitted during the timeslot. The frequency with the timeslots occur may be determined based on, for example, the amount and/or type of data to be communicated during the timeslots. For example, reserved timeslots may occur more frequently if high-bandwidth traffic, such as high-definition multimedia, is to be transmitted during the timeslots, and may occur less frequently if low-bandwidth traffic, such as network management traffic, is to be transmitted during the timeslots.

Figure 5:
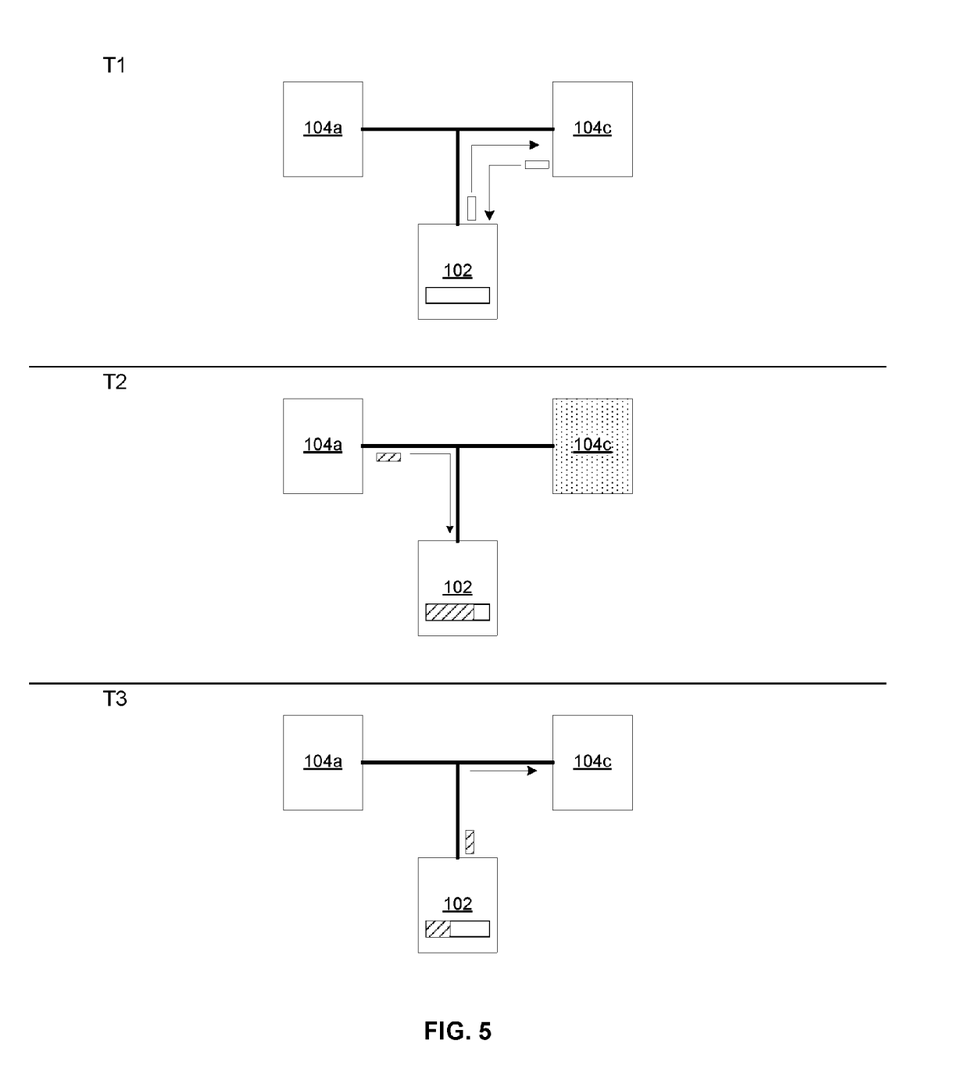
FIG. 5 depicts buffering data in a proxy to support a power-saving state of operation.

FIG. 5 depicts buffering data in a proxy to support a power-saving state of operation. Referring to FIG. 5, there is shown the devices 104a, 104c, and 102. During time interval T1 the devices 104c and 102 are exchanging messages to coordinate the device 104c going into a power-saving state. Note that communication may also occur with device 104a, though such communication is not illustrated. This coordination may include an exchange of parameters which enable the device 102 to receive packets destined for device 104c while device 104c is in the power-saving state. Many non-limiting examples of such parameters were presented previously. Also for example, such parameter exchange may include a negotiation between the device 104c and the device 102 regarding the manner (e.g., timing, amount, etc.) in which the device 102 may store information destined for the device 104c.

During time interval T2, the device may 104a may be sending packets destined for device 104c. In time interval T2, however, the device 104c is in a power-saving state in which it is not enabled to receive packets (or, for example, particular types of packets or signals). Accordingly, the device 102 receives and buffers the packets destined for device 104c. Such receiving and buffering may occur in accordance with parameters negotiated between the device 104c and the device 102.

During time interval T3, the device 104c may exit the power-saving state and the device 102 may transmit the buffered packets to the device 104c.

Note that in such an exemplary scenario, the source device 104a need not even be aware of the operation of and interaction between the device 102 and the device 104c. In other words, the device 104a may communicate to the device 104c in a completely normal manner, not even knowing that the device 104c is operating in and out of a power-save state. In such an exemplary scenario, though not illustrated in FIG. 5, the device 102 may communicate acknowledgement and other responsive messages to the device 104a on the behalf of the sleeping device 104c. For example, upon the successful completion of error detection by the device 102 for a received packet that is ultimately destined for the device 104c, the device 102 may send any required acknowledgement message to the device 104a. Such messaging may, for example, keep device 104a from timing out while waiting for an ACK message and believing that a communication error has occurred.

In another exemplary scenario, the device 104a may be made aware of the buffering by device 102. For example, in such a scenario, device 104a may send packets directly to the device 102 (e.g., rather than having the device 102 intercept packets addressed to the device 104c). In such a scenario, the source device 104a may either accept response messages (e.g., ACK messages) from the device 102 and/or may accept belated response messages from the device 104c upon buffered messages being forwarded to the device 104c (e.g., during its allocated timeslot).

Figure 6:
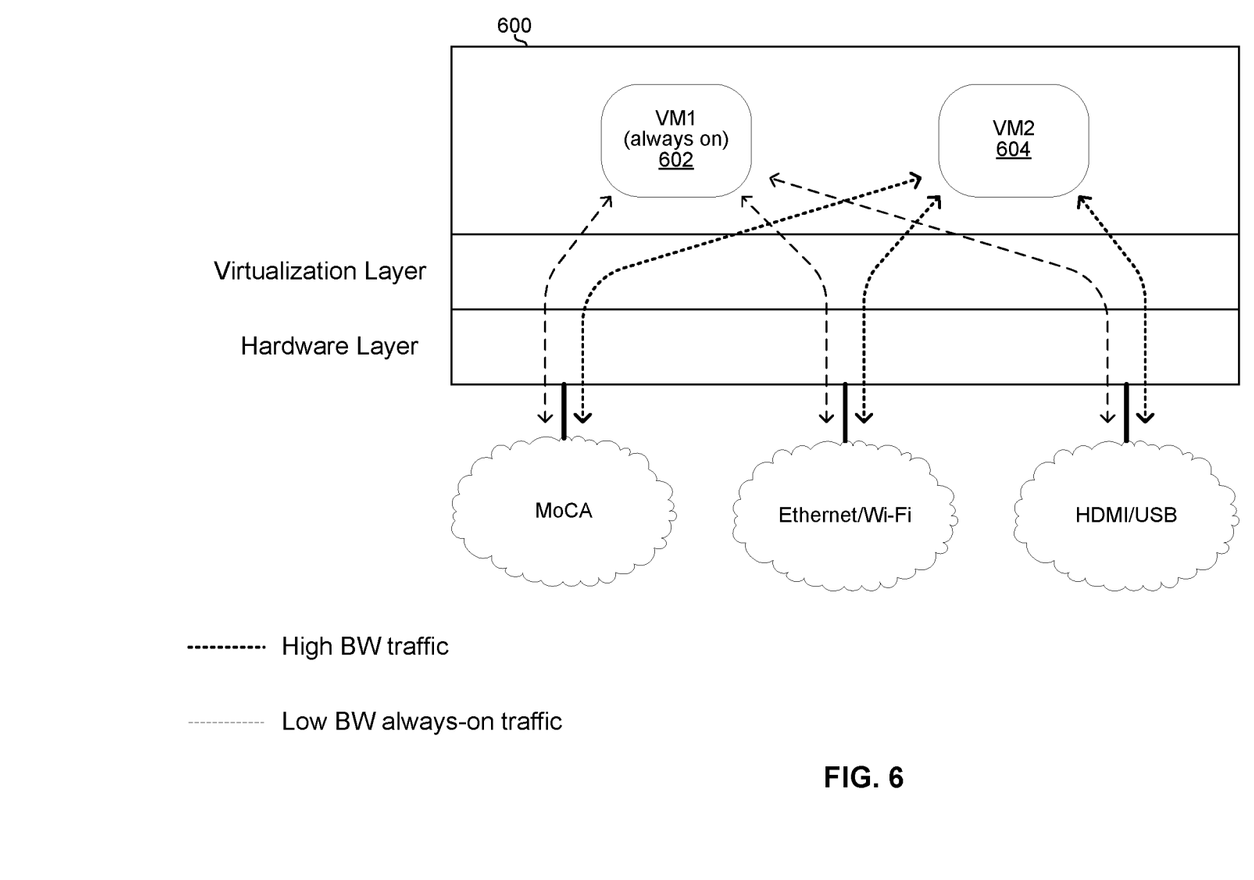
FIG. 6 depicts a network device which utilizes virtualization to support always-on traffic while operating in a power-saving state.

FIG. 6 depicts a network device which utilizes virtualization to support always-on traffic while operating in a power-saving state. Shown in FIG. 6 is a device 600 which may be an intermediate device operable to bridge communications between a MoCA network and one or more other communication links. The other communication link(s) may, for example, utilize another technology such as Ethernet, Wi-Fi, HDMI, or USB. The device 600 may comprise circuitry operable to run one or more virtual machines and communicate over one or more communication links. In an exemplary embodiment, virtual machines 602 and 604 may run on the device 600. The virtual machine 602 may handle connections to other devices that require an always-on connection to the MoCA network. The virtual machine 604 may handle connections to other devices that do not require an always-on connection to the MoCA network. The virtual machine 602 may use relatively fewer resources and consume less power than the virtual machine 604.

In operation, the virtual machine 602 may present itself to the MoCA network, and/or be treated by a network coordinator of the MoCA network, as a first node, and the virtual machine 604 may present itself to the MoCA network, and/or be treated by a network coordinator of the MoCA network, as a second node. In an embodiment of the invention, in order to treat the device 600 as two MoCA nodes, each of the virtual machines may be assigned a globally unique identifier. For example, the device 600 may have two MAC addresses. In another embodiment of the invention, the network coordinator and the device 600 may be enabled to coordinate treating the device 600 as two MoCA nodes even though the device 600 only has a single globally unique identifier.

In accordance with various aspects of the present invention, a first device of a multimedia over coax alliance (MoCA) network (e.g., device 102) may grant a second device of the MoCA network (e.g., device 104a) permission to enter a power-saving state. While the second device is in the power-saving state, the first device may grant bandwidth to the second device during one or more predetermined timeslots. The bandwidth may be granted without a corresponding reservation request from the second device. The predetermined timeslots may be determined via one or more messages exchanged between the first device and the second device prior to the granting of the permission to enter the power-saving state. The duration of the predetermined timeslots may be determined based on a type of data to be communicated to and/or from the second device. The frequency of the predetermined timeslots may be determined based on a type of data to be communicated to and/or from the second device.

Media access plan (MAP) messages may be transmitted at fixed intervals from a time prior to the second device entering the power-saving state until a time after the second device exits the power-saving state. There may be a fixed timing relationship between the predetermined timeslots and the MAP messages transmitted at the fixed intervals. While the second device is operating in the power-saving state, the first device may buffer data transmitted by a third device (e.g., device 104c) and destined for the second device until a next one of the one or more predetermined timeslots. The first device may transmit the buffered data to the second device during the next one of the one or more predetermined timeslots.

In accordance with various aspects of the present invention, a device of a multimedia over coax alliance (MoCA) network (e.g., device 104a) may receive, from a network coordinator of the MoCA network (e.g., device 102), permission to enter a power-saving state. While the device is in the power-saving state, it may track time utilizing a clock that is synchronized to the system time of the MoCA network, and transmit and/or receive during one or more predetermined timeslots without first transmitting a corresponding reservation request. The predetermined timeslots may be determined via one or more messages exchanged between the network coordinator and the device prior to the granting of the permission to enter the power-saving state. A duration of the predetermined timeslots may be determined based on a type of data to be communicated to and/or from the device. A frequency of the predetermined timeslots may be determined based on a type of data to be communicated to and/or from the device. While operating in the power-saving state, the device may buffer data to be transmitted into the MoCA network until a next one of the one or more predetermined timeslots, and transmit the data into the MoCA network during the next one of the one or more predetermined timeslots.

The device may utilize a first modulation profile when not operating in the power-saving state, and utilize a second modulation profile when operating in the power-saving state. While the device is operating in the power-saving state, media access plan (MAP) messages and beacons may transmitted in the MoCA network at fixed intervals. While the device is operating in the power-saving state, it may periodically wake up to receive one of the beacons, utilize a time stamp of the beacon to resynchronize a clock of the device to system time of the MoCA network, and then returning to the power-saving state.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for providing power-save operation in an in-home communication network.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   in a first device of a multimedia over coax alliance (MoCA) network:
      granting a second device of said MoCA network permission to operate in a power-saving mode; and
      granting bandwidth to said second device during one or more predetermined timeslots for utilization by said second device while operating in said power-saving mode, wherein said bandwidth is granted without a corresponding reservation request from said second device, wherein a duration of said predetermined timeslots is determined based on a type of data to be communicated to and/or from said second device.

2. The method of claim 1, wherein said predetermined timeslots are determined via one or more messages exchanged between said first device and said second device prior to said granting of said permission to enter said power-saving mode.

3. The method of claim 1, wherein a frequency of said predetermined timeslots is determined based on a type of data to be communicated to and/or from said second device.

4. The method of claim 1, comprising transmitting media access plan (MAP) messages at fixed intervals from a time prior to said second device operating in said power-saving mode until a time after said second device stops operating in said power-saving mode.

5. The method of claim 4, wherein there is a fixed timing relationship between said predetermined timeslots and said MAP messages transmitted at said fixed intervals.

6. The method of claim 1, comprising, in said first device:
   while said second device is operating in said power-saving mode:
      buffering data destined for said second device until a next one of said one or more predetermined timeslots, wherein said data is transmitted by a third device of said MoCA network; and
      transmitting said data to said second device during said next one of said one or more predetermined timeslots.

7. A method comprising:
   in a device of a multimedia over coax alliance (MoCA) network:
      receiving, from a network coordinator of said MoCA network, permission to enter a power-saving mode;
      entering said power-saving mode; and
      while said device is in said power-saving mode:
         tracking time utilizing a clock that is synchronized to system time of said MoCA network; and
         transmitting during one or more predetermined timeslots without first transmitting a corresponding reservation request, wherein a duration of said predetermined timeslots is determined based on a type of data to be communicated to and/or from said device.

8. The method of claim 7, wherein said predetermined timeslots are determined via one or more messages exchanged between said network coordinator and said device prior to said receiving of said permission to enter said power-saving mode.

9. The method of claim 7, wherein a frequency of said predetermined timeslots is determined based on a type of data to be communicated to and/or from said device.

10. The method of claim 7, comprising, in said device:
    while operating in said power-saving mode:
       buffering data to be transmitted into said MoCA network until a next one of said one or more predetermined timeslots; and
       transmitting said data into said MoCA network during said next one of said one or more predetermined timeslots.

11. The method of claim 7, comprising, in said device:
    utilizing a first modulation profile when not operating in said power-saving mode, and
    utilizing a second modulation profile when operating in said power-saving mode.

12. The method of claim 7, wherein media access plan (MAP) messages and beacons are transmitted in said MoCA network at fixed intervals.

13. The method of claim 12, comprising, in said device:
    while operating in said power-saving mode:
       periodically waking up from said power-saving mode to receive one of said beacons;
       utilizing a time stamp of said received beacon to resynchronize a clock of said device to system time of said MoCA network; and
       subsequent to said resynchronizing, returning to said power-saving mode.

14. A system comprising:
    one or more circuits for use in a first device of a multimedia over coax alliance (MoCA) network, said one or more circuits being operable to:
       grant a second device of said MoCA network permission to operate in a power-saving mode; and
       grant bandwidth to said second device during one or more predetermined timeslots for utilization by said second device while operating in said power-saving mode, wherein said bandwidth is granted without a corresponding reservation request from said second device, wherein a duration of said predetermined timeslots is determined based on a type of data to be communicated to and/or from said second device.

15. The system of claim 14, wherein said predetermined timeslots are determined via one or more messages exchanged between said first device and said second device prior to said granting of said permission to operate in said power-saving mode.

16. The system of claim 14, wherein a frequency of said predetermined timeslots is determined based on a type of data to be communicated to and/or from said second device.

17. The system of claim 14, wherein said one or more circuits are operable to transmit media access plan (MAP) messages at fixed intervals from a time prior to said second device operating in said power-saving mode until a time after said second device stops operating in said power-saving mode.

18. A method comprising:
in a first device of a multimedia over coax alliance (MoCA) network:
granting a second device of said MoCA network permission to operate in a power-saving mode; and
granting bandwidth to said second device during one or more predetermined timeslots for utilization by said second device while operating in said power-saving mode, wherein said bandwidth is granted without a corresponding reservation request from said second device, wherein a frequency of said predetermined timeslots is determined based on a type of data to be communicated to and/or from said second device.

19. The method of claim 18, wherein said predetermined timeslots are determined via one or more messages exchanged between said first device and said second device prior to said granting of said permission to enter said power-saving mode.

20. The method of claim 18, comprising transmitting media access plan (MAP) messages at fixed intervals from a time prior to said second device operating in said power-saving mode until a time after said second device stops operating in said power-saving mode.

21. The method of claim 20, wherein there is a fixed timing relationship between said predetermined timeslots and said MAP messages transmitted at said fixed intervals.

22. The method of claim 18, comprising, in said first device:
while said second device is operating in said power-saving mode:
buffering data destined for said second device until a next one of said one or more predetermined timeslots, wherein said data is transmitted by a third device of said MoCA network; and
transmitting said data to said second device during said next one of said one or more predetermined timeslots.

23. A method comprising:
in a device of a multimedia over coax alliance (MoCA) network:
receiving, from a network coordinator of said MoCA network, permission to enter a power-saving mode;
entering said power-saving mode; and
while said device is in said power-saving mode:
tracking time utilizing a clock that is synchronized to system time of said MoCA network; and
transmitting during one or more predetermined timeslots without first transmitting a corresponding reservation request, wherein a frequency of said predetermined timeslots is determined based on a type of data to be communicated to and/or from said device.

24. The method of claim 23, wherein said predetermined timeslots are determined via one or more messages exchanged between said network coordinator and said device prior to said receiving of said permission to enter said power-saving mode.

25. The method of claim 23, comprising, in said device:
while operating in said power-saving mode:
buffering data to be transmitted into said MoCA network until a next one of said one or more predetermined timeslots; and
transmitting said data into said MoCA network during said next one of said one or more predetermined timeslots.

26. The method of claim 23, comprising, in said device:
utilizing a first modulation profile when not operating in said power-saving mode, and
utilizing a second modulation profile when operating in said power-saving mode.

27. The method of claim 23, wherein media access plan (MAP) messages and beacons are transmitted in said MoCA network at fixed intervals.

28. The method of claim 23, comprising, in said device:
while operating in said power-saving mode:
periodically waking up from said power-saving mode to receive one of said beacons;
utilizing a time stamp of said received beacon to resynchronize a clock of said device to system time of said MoCA network; and
subsequent to said resynchronizing, returning to said power-saving mode.

29. A system comprising:
one or more circuits for use in a first device of a multimedia over coax alliance (MoCA) network, said one or more circuits being operable to:
grant a second device of said MoCA network permission to operate in a power-saving mode; and
grant bandwidth to said second device during one or more predetermined timeslots for utilization by said second device while operating in said power-saving mode, wherein said bandwidth is granted without a corresponding reservation request from said second device, wherein a frequency of said predetermined timeslots is determined based on a type of data to be communicated to and/or from said second device.

30. The system of claim 29, wherein said predetermined timeslots are determined via one or more messages exchanged between said first device and said second device priority to said granting of said permission to operate in is said power-saving mode.

31. Wherein said one or more circuits are operable to transmit media access plan (MAP) messages at fixed intervals from a time prior to said second device operating is said power-saving mode until a time after said second device stops operating in said power-saving mode.

* * * * *